United States Patent [19]

Allen, III et al.

[11] Patent Number: 5,227,109
[45] Date of Patent: Jul. 13, 1993

[54] METHOD FOR PRODUCING MULTICOMPONENT POLYMER FIBERS

[75] Inventors: Harry Allen, III, Lake City, S.C.; Daniel E. McMenamin, Kells, Ireland; Hubert J. Booth, Florence, S.C.

[73] Assignee: Wellman, Inc., Johnsonville, S.C.

[21] Appl. No.: 818,046

[22] Filed: Jan. 8, 1992

[51] Int. Cl.⁵ .............. B29C 47/06; B32B 31/30; D01D 5/34
[52] U.S. Cl. .................. 264/171; 425/131.5; 425/DIG. 217
[58] Field of Search .............. 264/171, 176.1; 425/131.5, 382.2, 463, 464, DIG. 217

[56] References Cited

U.S. PATENT DOCUMENTS

| | | | |
|---|---|---|---|
| 2,879,676 | 3/1959 | Burkhardt et al. | 76/107.6 |
| 3,332,858 | 7/1967 | Bittinger | 205/75 |
| 3,382,534 | 5/1968 | Veazey | 425/131.5 |
| 3,501,805 | 3/1970 | Douglas, Jr. et al. | 425/131.5 |
| 3,585,685 | 7/1969 | McDermott | 425/131.5 |
| 3,613,170 | 10/1971 | Soda et al. | 425/463 |
| 3,787,162 | 1/1974 | Cheetham | 425/463 |
| 3,825,456 | 7/1974 | Weber et al. | 156/633 |
| 3,849,044 | 11/1974 | Ando et al. | 425/131.5 |
| 3,963,406 | 6/1976 | Recker | 425/463 |
| 4,052,146 | 10/1977 | Sternberg | 425/463 |
| 4,307,054 | 12/1981 | Chion et al. | 264/171 |
| 4,381,274 | 4/1983 | Kessler et al. | 264/147 |
| 4,406,850 | 9/1983 | Hills | 264/171 |
| 4,414,276 | 11/1983 | Kiriyama et al. | 428/374 |
| 4,445,833 | 5/1984 | Moriki et al. | 425/131.5 |
| 4,738,607 | 4/1988 | Nakajima et al. | 425/131.5 |
| 5,162,074 | 11/1992 | Hills | 264/171 X |

FOREIGN PATENT DOCUMENTS

WO/89/029-38  4/1989  PCT Int'l Appl. .

Primary Examiner—Leo B. Tentoni
Attorney, Agent, or Firm—Bell, Seltzer, Park & Gibson

[57] ABSTRACT

A method of forming bicomponent fibers in a sheath-core relationship in a spinning pack that incorporates a plurality of adjacent plates that define predetermined flow paths therein for a sheath component and a core component to direct the respective components into the sheath-core relationship. The method comprises maintaining the differential pressure in the spinning pack between the sheath component and the core component low enough to avoid leaks and doglegging, while maintaining the total spinning pack pressure low enough to prevent leaks and doglegging.

17 Claims, 5 Drawing Sheets

METHOD FOR PRODUCING MULTICOMPONENT POLYMER FIBERS

FIELD OF THE INVENTION

The present invention relates to methods and apparatus for forming multicomponent polymer fibers, and in particular relates to an improved method of forming bicomponent polyester fibers in particular types of spinning apparatus.

BACKGROUND OF THE INVENTION

As the names respectively imply, "conjugate," "multicomponent" or "bicomponent" fibers are synthetic polymer filament materials that are formed from two or more types of polymers in adjacent relationship. The adjacent relationship can comprise a number of different arrangements and patterns as set forth in the various references cited as a part of this application. The general purpose of forming multicomponent fibers is to obtain two or more types of polymer properties in one fiber. For example, one method of bonding fibers to one another in non-woven textile fabric materials is to use a bicomponent fiber in which one component melts at a lower temperature than the other. When the correct amount of heat is applied, the lower melting component will melt and form adhering portions between the fibers to stabilize the non-woven fabric, while the other component remains solid and maintains the overall integrity of the non-woven fabric.

Other uses of bicomponent fibers are to produce fibers which will crimp naturally when heated because of the difference in the properties of the two components, for example different respective molecular orientations or different thermal properties. As known to those familiar with textiles, crimped fibers and yarns are particularly useful in clothing manufacture. Another use of multicomponent spinning technology is to produce integral filaments formed from several polymer components which can later be chemically separated to form extremely fine filaments, finer than those that would ordinarily be produced from a spinnerette head. These fine filaments are presently often referred to as "micro fibers" and demonstrate the capability to have a significant positive effect on increased consumer acceptance of polyester fabrics. This is particularly beneficial when the micro fiber fabrics exhibit desirable properties that consumers tend to favorably associate with "natural" fibers and fabrics.

One of the most common arrangements for multicomponent fibers is the bicomponent sheath-core relationship, which as its name implies, is a bicomponent filament material in which one component, referred to as the sheath, surrounds the other component which is referred to as the core.

The basic processes for forming bicomponent or multicomponent fibers are well understood. In general, separate streams of each polymer component must be directed from a supply source through a spinning head (often referred to as a "pack") in a desired flow pattern until they reach the exit portion of the pack; i.e., the spinnerette holes, from which they exit the spinning head in the desired multicomponent relationship. As might be expected, the design of the pack can be fairly complicated, and the manufacture of spinning heads to produce the desired flow patterns for the respective components is often similarly complex.

A recent improvement in such machinery and techniques has been set forth by William H. Hills in International Application PCT/US88/03330; International Publication No. WO 89/02938, published on Apr. 6, 1989 (the "'330 application"). The '330 application is incorporated entirely herein by reference. In this document, Hills describes a multicomponent spinning pack in which a portion of the flow paths of the respective component polymers are defined by a series of thin plates having appropriate groves or channels therein that direct the separate components to their desired positions and relationships as they exit the spinning pack in the form of a multicomponent fiber. The advantage suggested by Hills is that because the plates are relatively thin, they can be etched rather than machined into the desired flow patterns. Under some circumstances, etching is less difficult to carry out than are other processes such as casting, milling, or drilling when forming such flow paths.

The desirability of the thin etched plates also results from the potential ease with which they can be removed and replaced. Previously, the changing or cleaning of a spinning pack head for multicomponent fibers was an extremely time and labor intensive task, especially given the multiplicity of flow paths required to produce the multicomponent fibers.

The Hills apparatus is designed, however, so that many or all of the cleaning and flow path tailoring steps can be accomplished by simply removing the thin plates and replacing them with new ones. Additionally, Hills suggests that because the thin plates can be easily etched, as compared to the machining that is required for thicker plates, the production of various tailored plates, with which various tailored multicomponent fibers can be produced, will become much easier.

Nevertheless, applicants herein have attempted for some time to incorporate the teaching of the Hills publication, but without ultimate success. Specifically, it has been discovered that use of the apparatus and method as described by Hills leads to a number of problems during the spinning process, particularly when certain throughputs, polymer combinations, or sheath-core ratios are used. The most severe of these problems are the internal leakage in the spinning head combined with a "dog legging" and drip problem as the components exit the spinning head. As used in this art, "dog-legging" refers to the tendency of a stream of molten polymer to bend as it exits a spinnerette, rather than flowing in a straight path. If the bend in the dog leg is severe enough, the polymer stream will literally return and contact the spinnerette, and then drip inappropriately from it.

As best understood by the applicants, it appears that in the Hills apparatus the components tend to mix within the spinning head prior to the point, or just adjacent the point, at which they exit the spinning head. This is referred to as an "internal leak." The result is a fiber mixture that has been brought together prematurely and in which the desired sheath-core or other pattern relationship has been lost. The resulting fiber is either undesirable, or even useless, for its intended purposes.

Additionally, under certain circumstances the polymer will visibly leak from the pack at undesired and unintended positions, a problem referred to as an "external leak." At present, it appears and is assumed that external leaks are also indicative of internal leaks as just described.

In spite of these difficulties, the potential for the Hills type of apparatus appears to be quite good and it would be useful if methods and techniques could be developed that would permit the use of the thin plates in a spinning pack while eliminating the problems experienced in such devices to date.

It is thus an object of the present invention to provide a method of using a Hills type apparatus successfully in the production of bicomponent fibers and while eliminating the problems that to date have been inherent in any such use of Hills type machinery.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, in which:

DETAILED DESCRIPTION

In an overall sense, the invention herein can be broadly described as a method of keeping the differential pressure between the sheath and core components low enough to avoid leaks, dog legging, and drips. More preferably, in addition to keeping the differential pressure low, the invention also comprises keeping the total pressure, defined as the sum of the sheath and core pressures, low enough to prevent such leaks, dog legging, and drips. The pressures are kept high enough, of course, to keep the respective components moving appropriately through the pack.

Alternatively, because of the direct relationship between pressure and viscosity, the invention can be expressed as a method of keeping the differential pressure between the sheath and core polymers low enough to avoid the leaks and dog legging that have to date been characteristic of the Hills-type apparatus and method.

Thus, it will be understood that the method comprises control of a characteristic which can be expressed as pressure or viscosity, and in turn which can be described as differential pressures or total pressures. It will be further understood, however, that the pressures or viscosities will be tailored in given situations depending upon the nature of the core component, the nature of the sheath component, the throughput, and a number of the other variables characteristic of spinning of synthetic polymer fibers.

Figure 1:
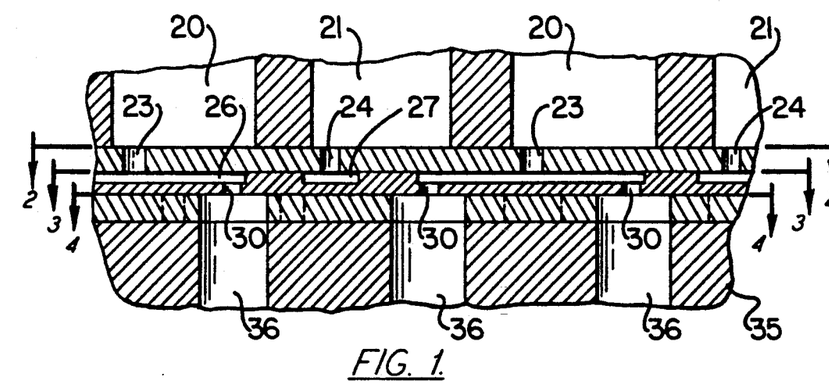
FIG. 1 is a cross-sectional view of a portion of a spinning head as described by the Hills application.
Figure 2:
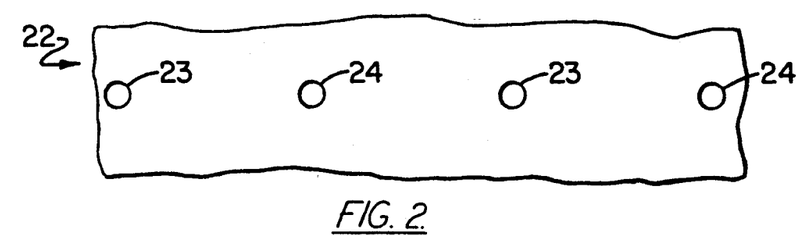
FIG. 2 is a plan view taken along line 2—2 of FIG. 1 of one of the thin plates described by Hills, specifically referred to as the "metering plate"

FIGS. 1 through 4 are illustrations that correspond to several set forth in the Hills' '330 application and are reproduced herein for clarity of explanation of the present invention. FIG. 1 is a cross-sectional view of that portion of the spinning head which incorporates the thin plates described by Hills in the relationship which illustrates the potential areas for problems. The chambers labeled A and B, respectively, carry the core component (A) and the sheath component (B). The respective chambers are designated at 20 (component A) and 21 (component B). FIG. 2 illustrates that the metering plate, broadly designated at 22, contains alternating circular openings, 23 and 24, through which the respective components pass. The core component passes from chamber 20 through opening 23 while the sheath component passes from chamber 21 through opening 24.

Figure 3:
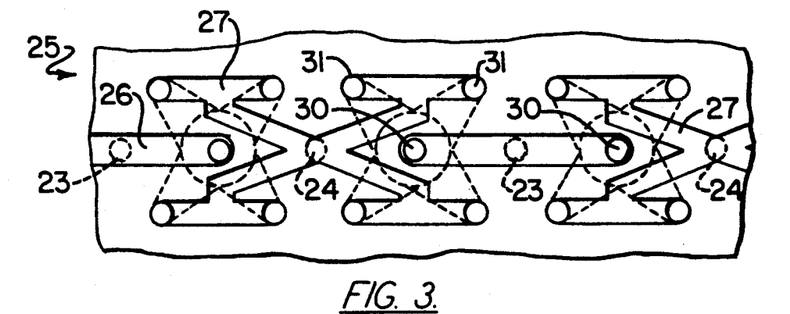
FIG. 3 is a plan view taken along line 3—3 of FIG. 1 of the thin etch plate referred to as the "M-plate" and illustrating its superimposed relationship with respect to the plate illustrated in FIG. 4.

The first destination of the respective components is the "M-plate" illustrated in FIG. 3 and broadly designated at 25. The M-plate contains two sets of flow channels for the respective polymer components. The set for the core component A are designated at 26, and those for the sheath component B at 27. FIG. 3 illustrates that the core component, upon reaching the M-plate, is directed to a longitudinal straight flow channel or slot 26 with openings 30 at either end. The B component reaches the somewhat more complex M-shaped slots 27 and is distributed in a series of patterns eventually reaching a set of openings 31 from which it progresses out of the M-plate.

Figure 4:
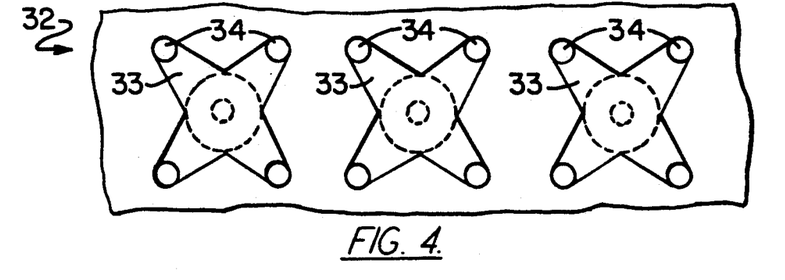
FIG. 4 is a plan view taken along line 4—4 of FIG. 1 of the "star plate" as described by Hills.

From the M-plate, both components exit to the "star plate" broadly designated at 32 in FIG. 4. As indicated by comparison of FIGS. 3 and 4, it will be seen that the openings 30 in the M-plate 25 for the core component A lead directly to the center of the somewhat star shaped patterns from which the star plate derives its name. Similarly, the openings 31 for the sheath component reach the outside corners 34 of the star shaped slot patterns of the star plate 32, which slot patterns are designated at 33. At the star plate, the core component A flows straight down while the sheath component B flows along the star shaped slots 33 in a surrounding relationship to the core component, thus producing the desired sheath-core pattern for the intended fiber. As stated earlier, it will be understood that if the patterns set forth in the M-plate of FIG. 3 and the star plate of FIG. 4 are varied, an almost infinite number of variations of bicomponent or multicomponent fibers can be produced. Therefore, these M and star plates are set forth as exemplary plates, rather than limiting descriptions.

Finally, the components A and B, now in the desired sheath-core relationship exit the pack through the spinnarette holes 36 in the spinnarette plate 35 (FIG. 1).

At this point, it will be understood that although the remaining description herein will be expressed in terms of sheath-core fibers and the metering plate, M-plate, and star plate, that the teachings of the present invention are equally applicable to any of the plates, combinations thereof, or resulting fiber patterns disclosed in or contemplated by the '330 application, and any equivalents of such plates, combinations, or fiber patterns.

The present invention, and the manner in which it improves upon the Hills disclosure, is best understood by comparing the various parameters that have been found to be either successful or unsuccessful. These parameters are set forth in the several sets of trials described herein.

First Set of Trials

In initial trials, low viscosity copolyester was used as a sheath polymer in combination with a much higher viscosity polyester as the core polymer. These tests were carried out at Hills, Inc. in W. Melbourne, Fla., using an apparatus as described in the '330 application. The low viscosity polymers tested were Eastman FA 300 available from Eastman, Rochester, N.Y., Huls S 1289 HV, and Huls VP 278, both available from Huls Adhesive Raw Materials, Division 4/M45, Huls Aklien-gesellschaft, Werk Troisdorf, P.O. Box 1347, D-5210 Troisdorf, Germany. The higher viscosity polymer was a virgin DuPont (1007 Market Street, Wilmington, Del.) polyethylene terephthalate (PET) having 0.61 reduced viscosity (RV). As used with respect to the spinning trials described herein, the term polyester specifically refers to polyethylene terephthalate.

As used herein, and as known to those of ordinary skill in this art, reduced viscosity is one measure of a polymer's characteristics. Generally speaking, viscosity is a fluid's internal resistance to flow. Viscosity is often measured by forcing a fluid through a particular restricted passage such as a capillary tube, and measuring the force and other conditions required. In evaluating polymer properties, the "melt viscosity" is the viscosity of the polymer in the molten state. Alternatively, "reduced viscosity" (RV) is the viscosity of a solution of the polymer in an appropriate solvent under specific conditions. The reduced viscosity of a polymer is related to its melt viscosity, but can be measured somewhat more easily and therefore more accurately.

In all of the work set forth herein, the reduced viscosity data was determined using ASTM method D2857, Section 8, Volume 8.02, page 628, 1985 print, with met-acresol (3-methylphenol) being used as the solvent.

Spinning results were unacceptable due to severe dog legging of fibers at the spinnerette face and dripping from the spinnerette holes. These trials were conducted using a 288 round hole spinnerette. The "M-plate" of the Hills' device was a standard 0.010" thick etched plate having 0.007" deep polymer distribution channels.

Second Set of Trials

In the next set of trials, the results of which are set forth in the pressure and viscosity data of Table 1, a critical relationship was discovered between the sheath and the core polymer viscosities and the fiber spinning performance. In these trials, also performed at Hills, the higher viscosity copolyesters used were a Bostik S174-758 from EMHART Bostik, Bostik Division, Boston Street, Middleton, Mass. 01949, and a recycled copolyester ("Co-PET") film from Mitech Wire Corp, 1300 Post Oak Blvd., Suite 1150, Houston, Tex., 77056. These trials demonstrated that when higher viscosity copolyesters were used as the sheath component in combination with 0.57 RV polyester as the core component, spinning performance was acceptable. Conversely, when lower viscosity copolyesters (the Huls S 1289 and VP 278 described above, along with a Goodyear PE 100, Goodyear Tire & Rubber Company, State Route 2, Apple Grove, W. Va. 25502) were used as the sheath component in combination with 0.57 RV polyester as the core, spinning performance was unacceptable. These results are summarized in Table 1.

In Table 1, the viscosity relationships are set forth as pressure data. In each case, the pressure of the sheath and core components was measured in pounds per square inch (psi) using pressure transducers located just adjacent the point at which each component entered the pack. Thus, the Differential Pressure and Total Pressure are calculated values derived from the measured pressures of the sheath and core components respectively.

TABLE 1

| | | Pressure Data (psi) | | | | |
|---|---|---|---|---|---|---|
| Sheath Resin | Core Resin | Sheath Press. | Core Press. | Diff. Press. | Total Press. | Spin. Perf. |
| a. Lower Vis. CoPET VP-278 From Huls | High Vis. PET | 1860 | 3340 | 1480 | 5200 | Poor |
| b. Lower Vis. CoPET S1289 From Huls | High Vis. PET | 1750 | 3300 | 1550 | 5050 | Poor |
| c. Lower Vis. CoPET PE 100 From Goodyear | High Vis. PET | 1050 | 2950 | 1990 | 4000 | Poor |
| d. Higher Vis. CoPET S174-758 From Bostik | High Vis. PET | 2190 | 3350 | 1160 | 5540 | OK |
| e. Higher Vis. CoPET From Mitech | High Vis. PET | 2120 | 3200 | 1080 | 5320 | OK |
| f. Lower Vis. CoPET VP278 From Huls | Reduced Vis. PET | 1420 | 2500 | 1080 | 3920 | OK |
| g. Lower Vis. CoPET S1289 From Huls | Reduced Vis. PET | 1200 | 2350 | 1150 | 3550 | OK |
| h. Lower Vis. CoPET PE 100 From Goodyear | Reduced Vis. PET | 700 | 2250 | 1550 | 2950 | OK |

| Viscosity Data | |
|---|---|
| | Reduced Viscosity |
| PET Core Polymer-Before Extrusion | .61 |
| PET Core Fiber-After Extrusion, 100% Dry Polymer | .57 (High Vis. PET) |
| PET Core Fiber-90/10 Dried/Undried Polymer | .51 (Lower Vis. PET) |
| *1Co-PET VP278 (Huls) | .57 |
| *2Co-PET S1289 (Huls) | .69 |
| *1Co-PET PE 100 (Goodyear) | .48 |
| *2Co-PET S174-758 (Bostik) | .79 |

TABLE 1-continued

| Co-PET Mitech | .56 |

*1 = Similar Polymer Chemistry
*2 = Similar Polymer Chemistry

Items a–e of Table 1 demonstrate that the polyester core viscosity was constant for all combinations. Accordingly, these results suggested that when the differential viscosity between the sheath and core polymers was reduced, spinning performance was improved to an acceptable state.

To further investigate these results, the viscosity of the polyester core polymer was reduced and the trials repeated in which poor spinning results had originally been obtained. In these trials, 90% dry polyester and 10% undried polyester were blended together to produce a reduced viscosity polyester core of 0.51 RV. All of these combinations performed well in spinning, as exhibited by Items f, g, and h of Table 1.

With respect to Table 1, it should be noted that all the pressure data can be compared directly, but the corresponding viscosity data can only be compared indirectly. Because of chemical differences between the copolyesters, copolyesters identified with an *1 are best compared to one another, and the copolyesters identified with *2 are similarly best compared to one another. All of the core resin polyester viscosity data, however, is comparable.

As used herein, and as generally referred to in this art, a copolyester is a polyester other than polyethylene terephthalate in which ethylene glycol has been replaced by another glycol or terephthalic acid has been replaced by another dicarboxylic acid. As known to those of ordinary skill in this art, the properties of a resulting polyester can be desirably modified through such substitutions without undue experimentation.

Further trials, however, indicated that when the data was properly analyzed, it demonstrated that when total pack pressure was high and was accompanied by a high differential pressure (viscosity) between the sheath and core polymers, spinning performance was poor, e.g., Table 1, Items a, b, and c. When the total pack pressure was high, but the differential pressure low, spinning performance was acceptable; Table 1, Items d and e. Alternatively, when total pressure and differential pressure were both low, spinning performance was acceptable; Table 1, Items f, g and h. All processing conditions remained constant throughout the testing; the only variable being the polymer viscosity. In all cases listed in Table 1 the sheath to core ratio was held constant at a 50/50 weight percent.

Third Set of Trials

In a third set of trials, again at Hills, a low viscosity copolyester (Goodyear PE 100) was incorporated as the sheath resin with a polyester of approximately 0.51 RV as the core resin. This viscosity combination was chosen on the basis of the results of the second set of trials. As set forth in Table 1, those trials demonstrated that the PE 100 copolyester performed well as a sheath when combined with a lower viscosity polyester core of 0.51 RV, e.g., Table 1, Item h. These trials were conducted using a total polymer throughput per spinnerette hole of 0.76 grams per minute. The same conditions were repeated in the third set of trials, and the sheath core spinning performance was again acceptable. The third set of trials is summarized in Table 2, and the specific condition is reported in Table 2, Item a.

TABLE 2

| Output/ Hole (g/min) | Sheath Pressure (psi) | Core Pressure (psi) | Differential Pressure (psi) | Total Pressure (psi) | Spinning Performance |
| --- | --- | --- | --- | --- | --- |
| 0.76 | 410 | 1615 | 1205 | 2025 | Good |
| 1.28 | 1000 | 2400 | 1400 | 3400 | Good/Fair |
| 1.62 | 1400 | 2730 | 1330 | 4130 | Poor |

As stated earlier with respect to these tests, the lab scale equipment available at Hills incorporated a pack with 288 holes. In comparison, a full scale commercial pack would incorporate approximately 1500 holes.

On a larger spinning pack of a size that would be desirable for commercial applications, the throughput per hole was set at 1.28 grams per minute (sometimes expressed as grams per hole per minute, g/h/min.). As this caused certain problems, an attempt was made to try and simulate, on the laboratory scale pack, the poor spinning results from the earlier tests by increasing the throughput. At the rate of 1.28 g/h/min. acceptable spinning was achieved, but dog legging of fibers was noted after about 30 minutes of spinning time. Nevertheless, although dog legs were present, no drips occurred and resulted in satisfactorily spinning; Table 2, Item b.

The rate was next increased to 1.62 g/h/min., and at this condition spinning was impossible due to severe dog legging of fibers and dripping from the spinnerette holes; Table 2, Item c.

The conclusions from these trials were that with a given viscosity combination a throughput (or pressure) limitation existed. This data confirmed the results from the first set of trials in which polymer viscosities were found to be critical and further demonstrated the negative effect of high spinnerette pressures on spinning performance. Testing conditions for Table 2 were constant with only the throughput being varied.

Although the inventors do not wish to be bound by any particular theory, it appears that the lab scale pack, and the thin plates it incorporates, does not flex as much under the pressure of polymer flow as does a full scale commercial size pack. Thus the leakage tendency is greater in the full scale pack than in the lab scale pack. This in turn helps explain why the apparatus and methods described in the Hills '330 application raise problems that give undesirable results under certain commercial conditions.

As stated initially, the goal of multicomponent spinning techniques is to provide the most desirable fiber product. From this standpoint, an ideal copolyester sheath, polyester core, bicomponent fiber employs a low viscosity sheath polymer with a high viscosity core polymer. The goal is to have the sheath melt and flow at typical commercial processing temperatures (e.g., 300°–350° F.) and thus uniformly bond the fibers at the points where they cross each other in a non-woven fabric. The high viscosity core is desired to enhance fiber spinning performance. Economics and bonding characteristics of the sheath core fiber dictate that higher throughputs per hole be used with dissimilar sheath and core viscosities. Accordingly, the following modifications to the design described in the '330 application were suggested.
1. Meter plates with core holes having larger diameters than the sheath holes; and
2. Spinnerette hole diameters increased from 0.35 millimeters (mm) to 0.5 mm.

To investigate these items, the following additional trials were conducted.

Fourth Set of Trials

The results of the fourth set of trials are set forth as Table 3, and were again conducted at Hills on the lab scale apparatus. In these trials, the modified meter plates and spinnerette holes were evaluated, both alone and in combination with each other, to determine the best solution to reducing the total pack pressure and the differential pressure. The goal was to produce an acceptable fiber spinning combination with the low viscosity copolyester sheath (S) and polyester core (C) combination (approximately 0.51 RV) at production rates greater than 1.28 g/min/hole.

TABLE 3

| | S/C Ratio | M-Plate Channel Depth | Out-Put/Hole gms/min | Sheath Press. (psi) | Core Press. (psi) | Diff. Press. (psi) | Tot. Press. Perf. | Spin Perf. |
|---|---|---|---|---|---|---|---|---|
| a. | 50/50 | .007" | .72 | 470 | 1730 | 1260 | 2200 | Good |
| b. | 50/50 | .007" | 1.22 | 1050 | 2670 | 1620 | 3720 | Dog Legs-but OK |
| c. | 50/50 | .007" | 1.56 | 1300 | 3000 | 1700 | 4300 | Poor |
| d. | 50/50 | .012" | .72 | 330 | 1080 | 750 | 1410 | Good |
| e. | 50/50 | .012" | 1.22 | 590 | 1600 | 1010 | 2190 | Good |
| f. | 50/50 | 0.12" | 1.56 | 740 | 1790 | 1050 | 2530 | Good |
| g. | 70/30 | .012" | .72 | 360 | 1450 | 1090 | 1810 | Poor |
| h. | 30/70 | .012" | .72 | 450 | 800 | 350 | 1250 | Good |

These trials demonstrated that neither the modified meter plate nor the larger diameter spinnerette holes were of any significant value in improving performance. This in turn suggested that the main factor in controlling the pressure drop was another pack component, the etched M-plate. When a deeper etched M plate was used, a significant reduction in total pressure was immediately observed; Table 3, Items a, b and c, as compared to Items d, e, and f.

The deeper channels and reduced pressures also resulted in good spinning performance, even at the highest throughput rate of 1.56 g/min/hole.

Table 3 demonstrates that if differential pressure is evaluated as a function of total pressure, and the pressure data from trials with 0.007 inch channels is compared with that using 0.012 inch channels, the results are about the same. In essence, this demonstrated that the differential pressure was not changed within a given M- plate. This, in turn, demonstrates that individual control of sheath and core pressures was not obtained merely by adjusting the M-plate. By way of explanation, the 0.012" channel depths may vary somewhat between 0.011 and 0.012" because of manufacturing tolerances, but are referred to herein by the design depth of 0.012".

Stated somewhat differently, if both sheath channels are increased, the total pressure may be reduced, improving the situation somewhat with respect to the problems caused by high total pressure. Nevertheless, under such an arrangement the pressure differential is not reduced, and the problems associated with a high pressure differential remain present.

Table 3, Items g and h, however, again demonstrate the importance of controlling the sheath to core differential pressure. Item g demonstrates a 30/70 ratio of sheath to core, and although the total pack pressure is low, the differential is high, and poor spinning performance results. When the ratio was reversed to 70/30, Item h, the total pressure was low and the differential pressures were both low with resulting good spinning performance.

Fifth Set of Trials

A fifth set of trials are summarized in Table 4, and FIGS. 6-11, and these trials generally supported the data and conclusions resulting from the previous trials. These trials were carried out on a full size commercial pack, however, at the facilities of Wellman International Ltd. in Mullagh, County Mfath, in the Republic of Ireland. Certain differences were evaluated, however, in an attempt to reduce total pack pressure and differential pressure between the sheath and core polymers. These modifications were:
1. Spinnerette hole diameters increased from the standard 0.35 mm to 0.50 mm.
2. Etched M-plates having each 0.012" and 0.015" deep channels compared to the standard 0.007" deep channels; and
3. Thin star plates (0.004" thick) compared to the standard 0.010" thick star plate.

As known to those familiar with this art, monitoring pump speed is another method of comparing pressures.

TABLE 4

| | SHEATH | CORE |
|---|---|---|
| TRIAL 1 | | |
| MATERIAL | HULS S1279 AMORPHOUS | PET CHIP BLEND |
| MELT VISCOSITY* AT 285° C. | 100-150 POISE | 1300-1500 POISE |
| TRIAL 2 | | |
| MATERIAL | DOW 6805 | PET CHIP BLEND |
| VISCOSITY AT 285° C. | 400-450 POISE | 1500-1600 POISE |

*OBTAINED FROM ONLINE VISOMETER.

These results demonstrated that the deeper M-plates were very effective at reducing the total pack pressure and also the differential pressures. In all cases where these M-plates were used, the spinning performance was acceptable. When the standard M-plates with 0.007" deep channels were substituted, however, total and differential pressures increased, and spinning performance became unacceptable in every case. The thinner star plate did result in a slight sheath pressure increase, which gave a corresponding decrease in the sheath and core differential pressure. The effect of the thinner star plate was minimal, however, and not considered significant enough to justify further evaluation. The larger diameter spinnerette holes of 0.5 mm, when compared to 0.35 mm holes, did appear to slightly decrease the total pack pressure, but the effect was again minimal.

The results herein are set forth in Table 5, and FIGS. 6–11.

TABLE 5

| Spinnerette No. | Orifice Size (mm) | Pack Configuration | | | Spinning Performance |
|---|---|---|---|---|---|
| | | Flow Channel Depth (Sheath) | Flow Channel Depth (Core) | Star Plate Thickness (Thou.) | |
| 2002 | 0.5 | 15 | 15 | 10 | Excellent at all pump speeds. Quenched best. Spinnerette easiest cleaned |
| 2001 | 0.5 | 12 | 12 | 10 | Same as 2002 |
| 2011 | 0.35 | 15 | 15 | 10 | No dripping at any pump seeds |
| 2013 | 0.35 | 15 | 15 | 4 | Same as 2011 |
| 2009 | 0.35 | 12 | 12 | 10 | Same as 2011 |
| 2014 | 0.35 | 7 | 7 | 10 | Dripping at corners. Progressively worse at higher pump speeds |

Figure 5:
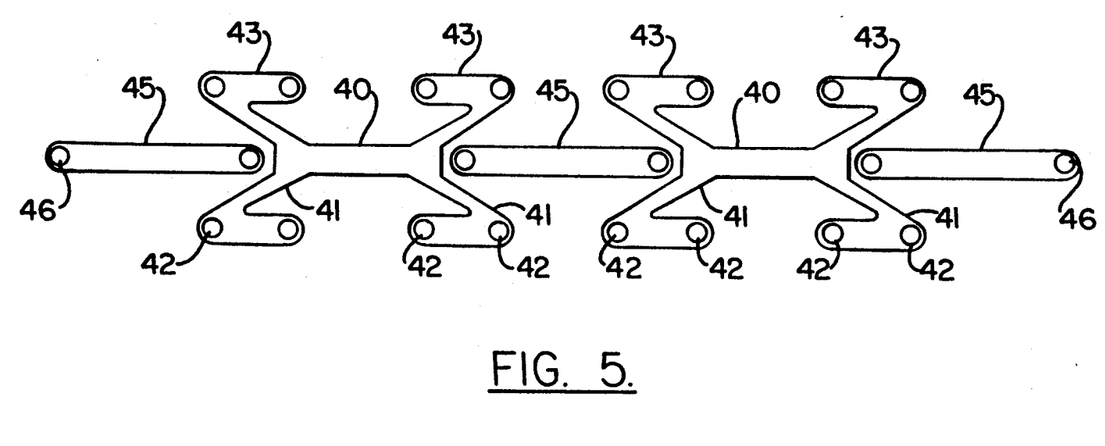
FIG. 5 is a plan view of a modified M-plate.
Figure 6:
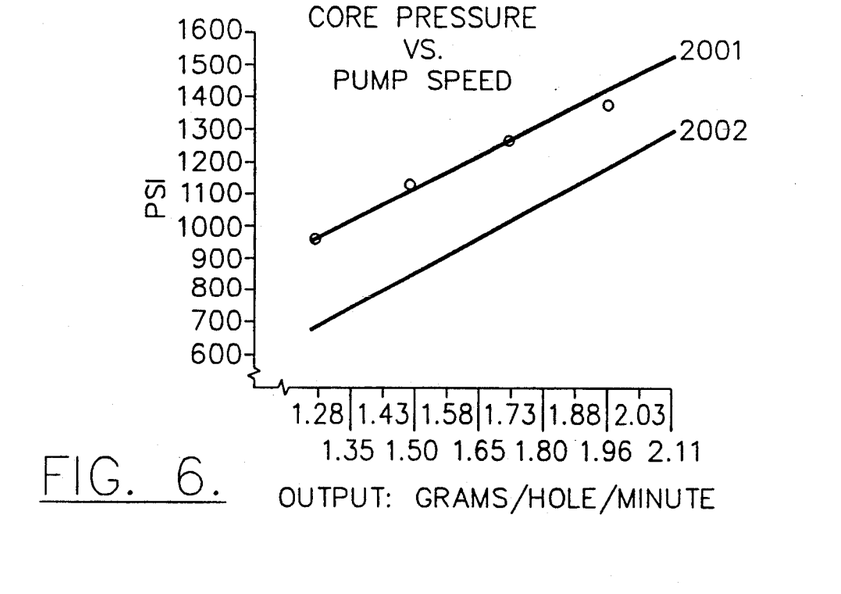
FIG. 6 is a graph of core pressure vs. throughput for several of the examples described herein.
Figure 7:
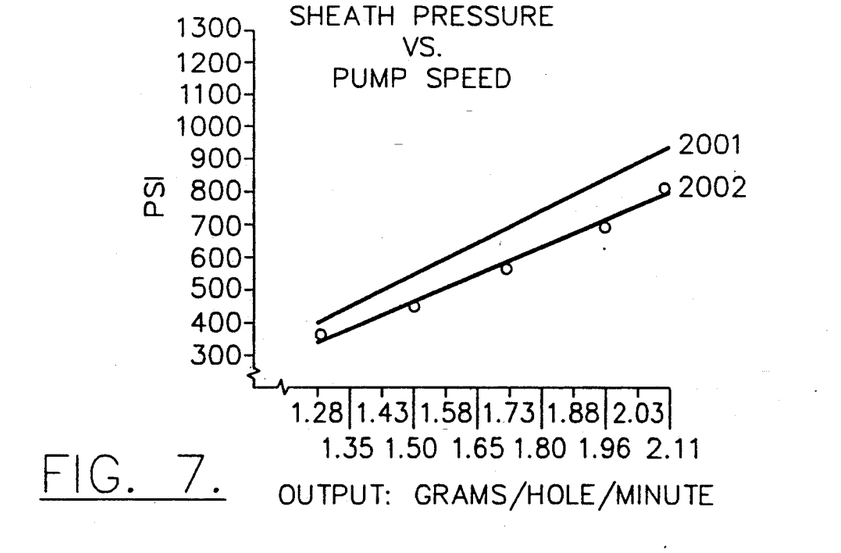
FIG. 7 is a plot of sheath pressure vs. throughput for the same trial.
Figure 8:
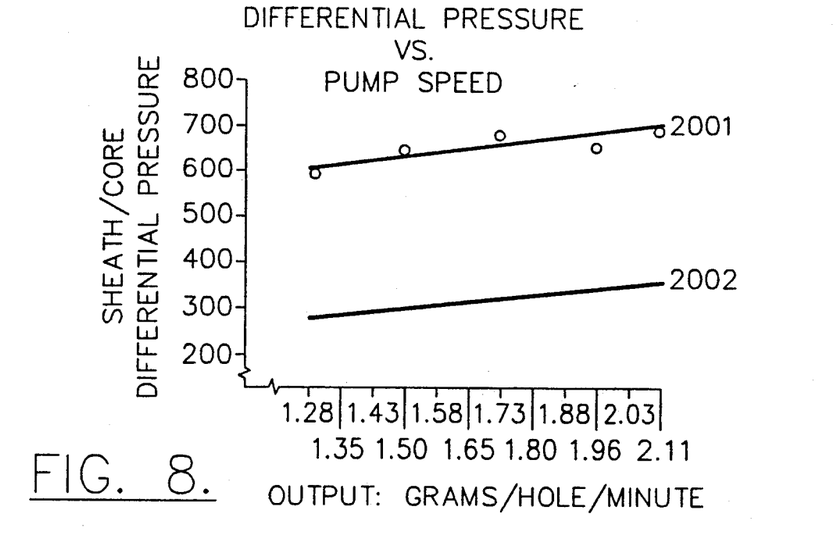
FIG. 8 is a plot of differential pressure vs. throughput for these trials.
Figure 9:
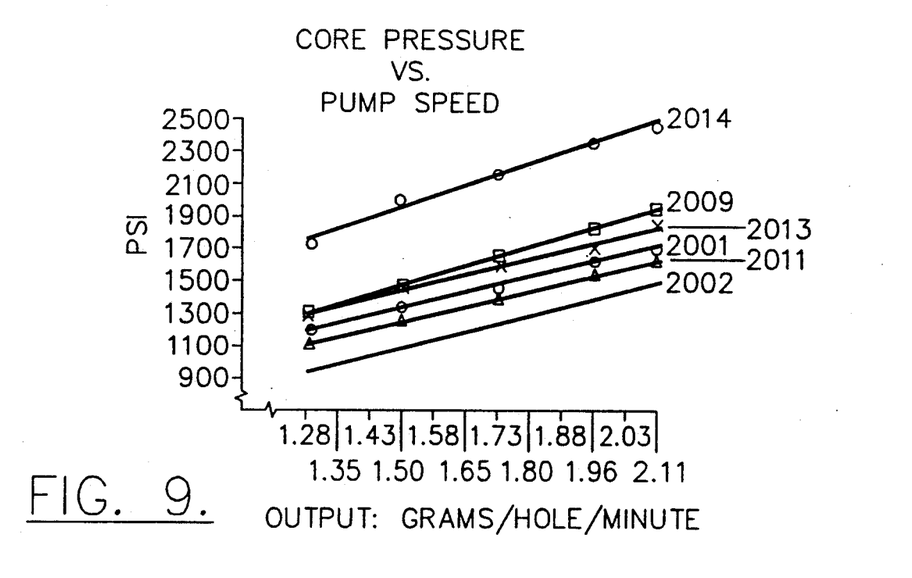
FIG. 9 is a plot of core pressure vs. throughput for an alternative set of trials.
Figure 10:
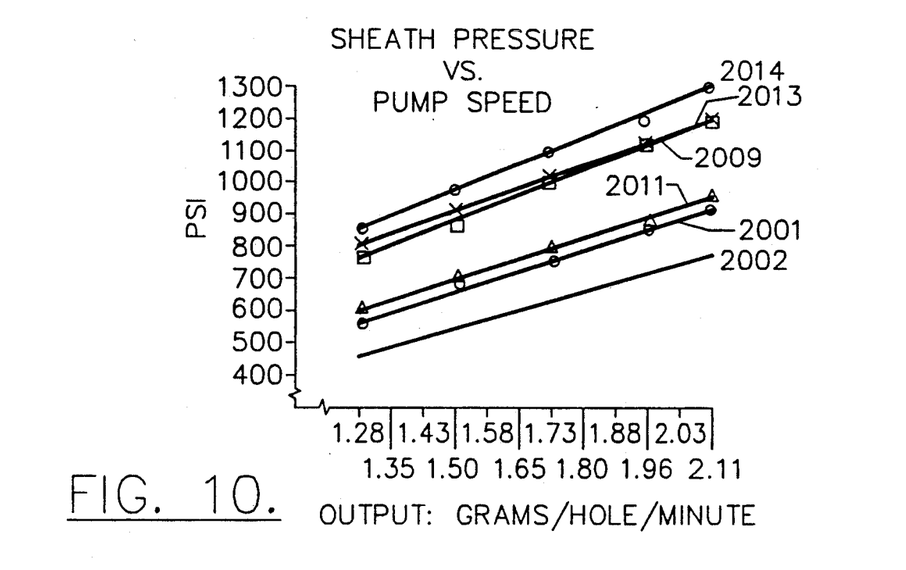
FIG. 10 is a plot of sheath pressure vs. throughput for the examples of FIG. 8.
Figure 11:
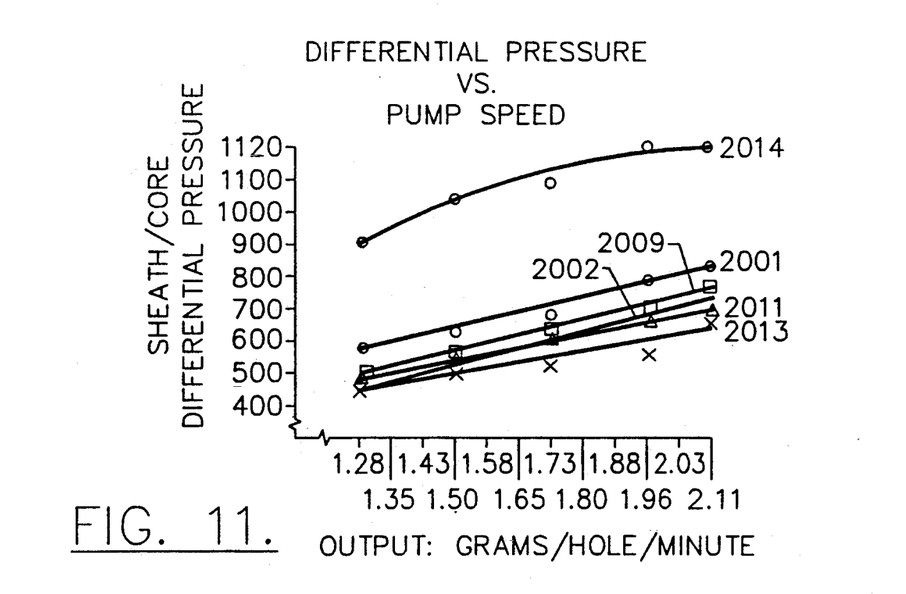
FIG. 11 is a plot of differential pressure vs. throughput corresponding to the data in FIGS. 9 and 10.

As one further change, the M-Plate with the deeper channel also was evaluated with the sheath channel width modified. This modified M-plate is illustrated at FIG. 5. The modified plate includes sheath flow channels at 40, 41, 42, and 43. The core flow channels are illustrated at 45 and 46. Several such plates were evaluated according to the relationships set forth in Table 6 (all dimensions are in inches):

TABLE 6

| Flow Channel Depth | Sheath Flow Channel (FIG. 6) | | | | Core Flow Channel (FIG. 6) | |
|---|---|---|---|---|---|---|
| | 40 | 41 | 42 | 43 | 44 | 45 |
| 0.007 | 37 | 30 | 20 | 30 | 37 | 20 |
| 0.012 | 33 | 18 | 25 | 30 | 42 | 30 |
| 0.015 | 39 | 22 | 23 | 35 | 47 | 35 |

When the 0.007" deep sheath channel plate was compared to the 0.012" or 0.015" deep channel plate, the results indicated that the narrow channel created a restriction and corresponding increase in sheath pressure. This, in turn, reduced the differential pressure between the sheath and core polymer streams.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A method of forming multicomponent fibers in a spinning pack, the method comprising:

directing a stream of a first polymer component from a supply source through a spinning pack in a desired flow pattern and at a predetermined flow pressure until the stream reaches the spinnerette holes, and from which the stream exits the spinning pack in a desired multicomponent relationship;

directing a stream of a second polymer component from a supply source through the same spinning pack in a second desired flow pattern separate from the stream of the first polymer and at a second predetermined flow pressure until the stream reaches the spinnerette holes, and from which the stream exits the spinning head in a desired multicomponent relationship with respect to the first polymer component;

defining the flow paths of the first and second polymer components along and through a stacked plurality of adjacent thin plates in which each plate has appropriate groves or channels therein that direct the separate components to their desired positions and relationships as they exit the spinning pack in the form of a multicomponent fiber;

maintaining the differential between the pressure of the first polymer component and the pressure of the second polymer component low enough to prevent the respective components from forcing themselves between and along the adjacent plates other than through and along the predetermined flow paths defined by the plurality of plates and low enough to maintain the stream of molten polymer to flow in a straight path as it exits the spinnerette; and while maintaining the sum of the first and second flow pressures low enough to prevent the respective components from forcing themselves between and along the adjacent plates other than through and along the predetermined flow paths defined by the plurality of plates and low enough to maintain the stream of molten polymer to flow in a straight path as it exits the spinnerette; and while maintaining the first and second flow pressures high enough to keep the respective components moving appropriately through the pack.

2. A method according to claim 1 wherein the step of maintaining the differential pressure between the sheath component and the core component low enough to avoid leaks and doglegging comprises maintaining the differential pressure at 1600 psi or less.

3. A method according to claim 1 wherein the step of maintaining the total pack pressure low enough to prevent leaks and doglegging comprises maintaining the total pressure at 5600 psi or less.

4. A method according to claim 1 wherein the step of maintaining the differential pressure between the sheath component and the core component low enough to avoid leaks and doglegging comprises maintaining the core component pressure at 3400 psi or less.

5. A method according to claim 1 wherein the step of maintaining the differential pressure between the sheath component and the core component low enough to avoid leaks and doglegging comprises maintaining the sheath component pressure at 2200 psi or less.

6. A method according to claim 1 wherein the step of directing a first polymer component comprises directing a high viscosity polyethylene terephthalate polymer and the step of directing a second polymer component comprises directing a higher viscosity copolyester of polyethylene terephthalate.

7. A method according to claim 1 wherein the step of directing a first polymer component comprises directing a reduced viscosity polyethylene terephthalate polymer and the step of directing a second polymer component comprises directing a lower viscosity copolyester of polyethylene terephthalate.

8. A method according to claim 1 wherein the step of maintaining the differential pressure in the spinning pack between the sheath component and the core component low enough to avoid leaks and doglegging comprises maintaining the sheath component pressure at about 2190 psi and the core component pressure at about 3350 psi.

9. A method according to claim 1 wherein the step of maintaining the differential pressure in the spinning pack between the sheath component and the core component low enough to avoid leaks and doglegging comprises maintaining the sheath component pressure at about 2120 psi and the core component pressure at about 3200 psi.

10. A method according to claim 1 wherein the step of maintaining the differential pressure in the spinning pack between the sheath component and the core component low enough to avoid leaks and doglegging comprises maintaining the sheath component pressure at about 1420 psi and the core component pressure at about 2500 psi.

11. A method according to claim 1 wherein the step of maintaining the differential pressure in the spinning pack between the sheath component and the core component low enough to avoid leaks and doglegging comprises maintaining the sheath component pressure at about 1200 psi and the core component pressure at about 2350 psi.

12. A method according to claim 1 wherein the step of maintaining the differential pressure in the spinning pack between the sheath component and the core component low enough to avoid leaks and doglegging comprises maintaining the sheath component pressure at about 700 psi and the core component pressure at about 2250 psi.

13. A method of forming bicomponent fibers in a spinning pack, the method comprising:
   directing a stream of a first polymer component from a supply source through a spinning pack in a desired flow pattern and at a predetermined flow pressure until the stream reaches the spinnerette holes, and from which the stream exits the spinning pack as the core component in a desired bicomponent relationship;
   directing a stream of a second polymer component from a supply source through the same spinning pack in a second desired flow pattern separate from the stream of the first polymer and at a second predetermined flow pressure until the stream reaches the spinnerette holes, and from which the stream exits the spinning pack as the sheath component surrounding the core component in a desired bicomponent relationship;
   defining the flow paths of the sheath and core polymer components along and through a stacked plurality of adjacent thin plates in which each plate has appropriate groves or channels therein that direct the separate components to their desired positions and sheath-core relationship as they exit the spinning pack in the form of a bicomponent fiber;
   maintaining the sum of the sheath and core flow pressures low enough to prevent the respective components from forcing themselves between and along the adjacent plates other than through and along the predetermined flow paths defined by the plurality of plates and low enough to maintain the stream of molten polymer to flow in a straight path as it exits the spinnerette; and while
   maintaining the sheath component and core component flow pressures high enough to keep the respective components moving appropriately through the pack.

14. A method according to claim 13 further comprising the step of maintaining the sheath to core ratio at 50 percent by weight core component and 50 percent by weight sheath component.

15. A method of forming bicomponent fibers in a spinning pack, the method comprising:
   directing a stream of a first polymer component from a supply source through a spinning pack in a desired flow pattern and at a predetermined flow pressure until the stream reaches the spinnerette holes, and from which the stream exits the spinning pack as the core component in a desired bicomponent relationship;
   directing a stream of a second polymer component from a supply source through the same spinning pack in a second desired flow pattern separate from the stream of the first polymer and at a second predetermined flow pressure until the stream reaches the spinnerette holes, and from which the stream exits the spinning pack as the sheath component surrounding the core component in a desired bicomponent relationship;
   defining the flow paths of the sheath and core polymer components along and through a stacked plurality of adjacent thin plates in which each plate has appropriate groves or channels therein that direct the separate components to their desired positions and sheath-core relationship as they exit the spinning pack in the form of a bicomponent fiber;
   maintaining the differential between the pressure of the sheath component and the pressure of the core component low enough to prevent the respective components from forcing themselves between and along the adjacent plates other than through and along the predetermined flow paths defined by the plurality of plates and low enough to maintain the stream of molten polymer to flow in a straight path as it exits the spinnerette; and while
   maintaining the sheath component and core component flow pressures high enough to keep the respective components moving appropriately through the pack.

16. A method of forming bicomponent fibers in a spinning pack, the method comprising:
   directing a stream of a first polymer component from a supply source through a spinning pack in a desired flow pattern and at a predetermined flow pressure until the stream reaches the spinnerette holes, and from which the stream exits the spinning pack as the core component in a desired bicomponent relationship;
   directing a stream of a second polymer component from a supply source through the same spinning pack in a second desired flow pattern separate from the stream of the first polymer and at a second predetermined flow pressure until the stream reaches the spinnerette holes, and from which the stream exits the spinning pack as the sheath component surrounding the core component in a desired bicomponent relationship;

defining the flow paths of the sheath and core polymer components along and through a stacked plurality of adjacent thin plates in which each plate has appropriate groves or channels therein that direct the separate components to their desired positions and sheath-core relationship as they exit the spinning pack in the form of a bicomponent fiber; and while maintaining the differential viscosity between the sheath and core components low enough to avoid leaks and dogglegging.

17. A method according to claim 16 wherein the step of maintaining the differential viscosity between the sheath component and the core component low enough to avoid leaks and dogglegging comprises maintaining the differential viscosity low enough to prevent the respective components from forcing themselves between and along the adjacent plates other than through and along the predetermined flow paths defined by the plurality of plates.

* * * * *

UNITED STATES PATENT AND TRADEMARK OFFICE
CERTIFICATE OF CORRECTION

PATENT NO. : 5,227,109
DATED : July 13, 1993
INVENTOR(S) : Allen, III, et al.

It is certified that error appears in the above-identified patent and that said Letters Patent is hereby corrected as shown below:

On the title page, item (56):

UNDER "REFERENCES CITED":

"Recker" should be -- Reker --

Column 2, line 10, "groves" should be -- grooves --

Column 4, lines 57-58, "spinnarette" should be -- spinnerette --

Column 9, line 1 of Table 3, "Out-Put" should be - Output --

Column 9, line 9 of Table 3, "0.12" should be -- .012 --

Column 9, line 44, "M plate" should be -- M-plate --

Column 9, line 57, "M- plate" should be -- M-plate --

Column 9, line 61, "0.011" should be -- 0.011" --

Column 10, line 54, need space before "Trial 2"

Column 11, line 24, "seeds" should be -- speeds --

Column 12, line 15, "groves" should be -- grooves --

Column 13, line 59, "groves" should be -- grooves --

UNITED STATES PATENT AND TRADEMARK OFFICE
CERTIFICATE OF CORRECTION

PATENT NO. :  5,227,109
DATED      :  July 13, 1993
INVENTOR(S):  Allen, III, et al.

It is certified that error appears in the above-identified patent and that said Letters Patent is hereby corrected as shown below:

Column 14, line 33, "groves" should be -- grooves --

Column 15, line 4, "groves" should be -- grooves --

Column 16, line 3, "dogglegging" should be -- doglegging --

Signed and Sealed this

Twenty-sixth Day of April, 1994

Attest:

BRUCE LEHMAN

*Attesting Officer*    *Commissioner of Patents and Trademarks*